No. 892,004. PATENTED JUNE 30, 1908.
J. E. McKINZIE.
POULTRY ROOST.
APPLICATION FILED MAY 13, 1907.
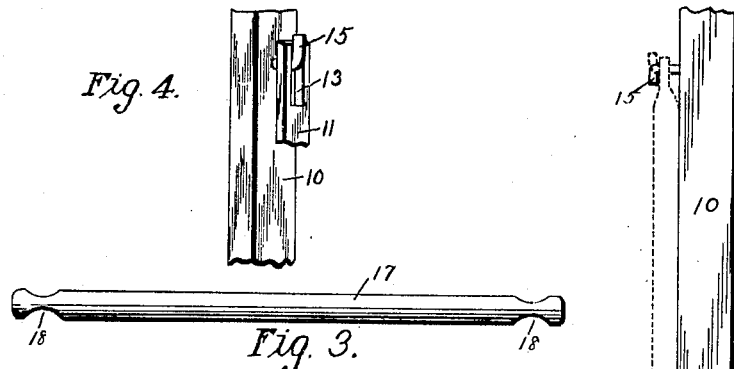
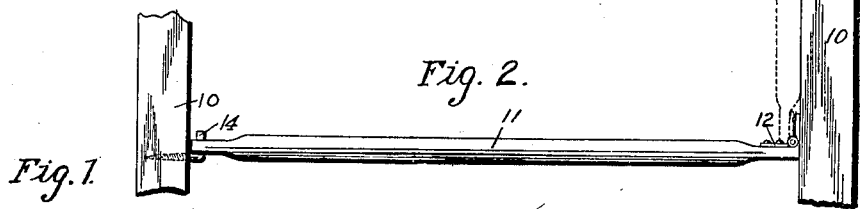
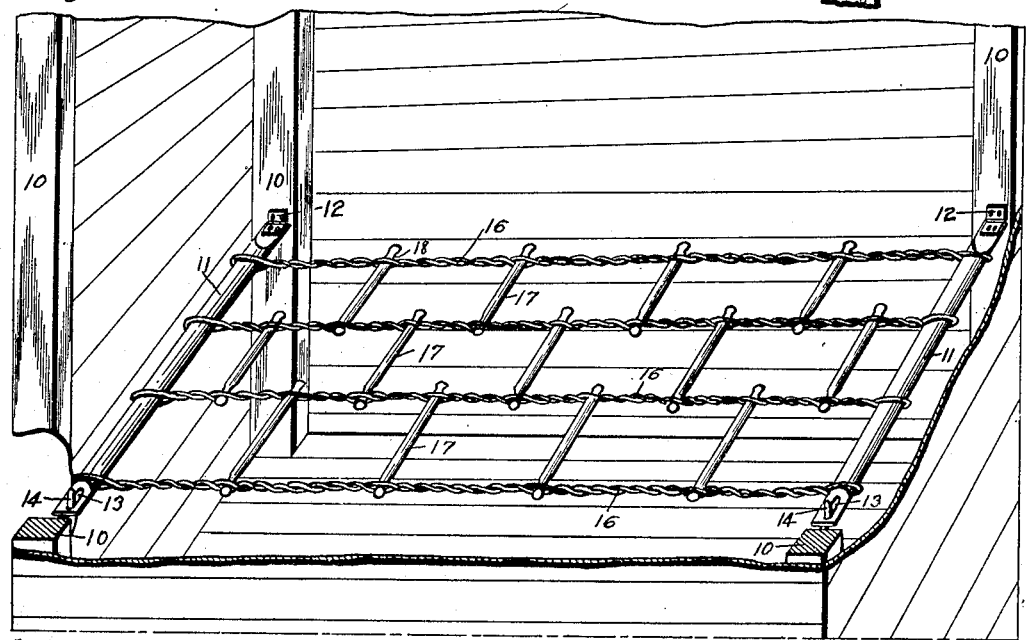
Witnesses.
P. C. Dahlberg.
J. B. Smutney.
Inventor:
John E. McKinzie.
by Orwig & Lane
atty's.

UNITED STATES PATENT OFFICE.

JOHN E. McKINZIE, OF WINTERSET, IOWA.

POULTRY-ROOST.

No. 892,004.  Specification of Letters Patent.  Patented June 30, 1908.

Application filed May 13, 1907. Serial No. 373,384.

*To all whom it may concern:*

Be it known that I, JOHN E. McKINZIE, a citizen of the United States, residing at Winterset, in the county of Madison and State of Iowa, have invented a certain new and useful Poultry-Roost, of which the following is a specification.

The object of my invention is to provide a poultry roost of simple, durable and inexpensive construction capable of standing in a horizontal position when in use and also capable of being quickly and easily folded against a side wall when not in use so that access may be had to the space under the roost for cleaning purposes, and further to provide a poultry roost in which poultry lice or other parasites will not travel from the walls of the building to the roost pieces or from one roost piece to the other and to provide a roost in which a single fowl will occupy each roost piece and the fowls will be so spaced apart that they will not touch each other when on the roost so that insects or parasites on one fowl will not spread to other fowls.

My invention consists in certain details in the construction, arrangement and combination of the various parts of the device, whereby the objects contemplated are attained, as hereinafter more fully set forth, pointed out in my claims and illustrated in the accompanying drawings, in which—

Figure 1 shows a perspective view of a portion of a building equipped with my improved poultry roost shown in its horizontal position ready for use. Fig. 2 shows an end view of my improved poultry roost with the end piece supported in a horizontal position. The dotted lines in said figure show said end piece supported in a vertical position. Fig. 3 shows a detail edge view of one of the roost pieces, and Fig. 4 shows a detail, perspective view illustrating the end of one of the end pieces supported in a vertical position by means of a hook.

Referring to the accompanying drawings, I have used the numeral 10 to indicate the uprights of the building in which the roost is placed. The roost proper comprises two wooden end pieces 11 connected by hinges 12 at one end with two of the uprights 10. The free ends of the end pieces are provided with slots 13 and fixed to the uprights 10 opposite from the ones to which the end pieces are hinged are the hooks 14 designed to enter the slots 13 and to thereby support the end pieces in horizontal positions. I have also provided for supporting these end pieces in upright positions as follows: Attached to the same uprights 10 to which the end pieces are hinged are the hooks 15 capable of being easily turned in their supports. These hooks are so arranged that when they extend downwardly, as shown by dotted lines in Fig. 2, they will enter the slots 13 when the end pieces are swung to upright positions. Then by turning said hooks to the position shown in Fig. 4, the end pieces are firmly held in position and can be released only by turning the hooks downwardly.

Attached to the end pieces 11 is a series of longitudinal wires 16, each wire being doubled and twisted, said wires being spaced apart an equal distance from each other. The roost pieces are preferably made of wood and each comprises a straight body portion 17 with notches 18 at its ends. These roost pieces are secured to the wires by having the ends projected through the ends of the twisted and doubled wires, thus firmly connecting the roost pieces with the wires. These roost pieces are arranged in rows spaced apart equal distances from each other, the roost pieces from one row being arranged midway between the roost pieces of the adjacent row so that all of the roost pieces are in staggered positions. These roost pieces are made of such length that only one fowl may occupy one roost piece and on account of the staggered relation of said roost pieces a fowl upon one roost piece will not touch a fowl upon any adjacent roost piece. In this way all crowding together of the fowls is avoided and the weaker ones are not thrown from the roost by the stronger ones. The supporting hooks 14 are spaced apart from each other so far that when the end pieces 11 are connected with them, the longitudinal wires 16 will be stretched taut.

Having thus described my invention, what I claim and desire to secure by Letters Patent of the United States therefor is—

1. In a poultry roost, the combination of a series of longitudinal wires, and a number of rows of wooden roost pieces supported by the wires, the roost pieces of one row being in staggered positions with relation to those of the adjacent row.

2. In a poultry roost, the combination of a number of doubled twisted wires in parallel positions, and a number of rows of short wooden roost pieces with notched ends inserted in the wires and supported thereby, the roost pieces in one row being out of line with those of the next row.

3. In a poultry roost, the combination of two end pieces, a number of parallel wires fixed to the end pieces, and a number of rows of short wooden roost pieces, supported by the wires, each extending from one wire to the next, the roost pieces of one row being staggered with relation to those of the adjoining row.

Des Moines, Iowa, February 1, 1907.

JOHN E. McKINZIE.

Witnesses:
   B. N. CLARK,
   I. W. CLARK.